US008803990B2

(12) United States Patent
Smith

(10) Patent No.: US 8,803,990 B2
(45) Date of Patent: Aug. 12, 2014

(54) IMAGING SYSTEM WITH MULTIPLE SENSORS FOR PRODUCING HIGH-DYNAMIC-RANGE IMAGES

(75) Inventor: Scott Smith, San Jose, CA (US)

(73) Assignee: Aptina Imaging Corporation, George Town (KY)

( * ) Notice: Subject to any disclaimer, the term of this patent is extended or adjusted under 35 U.S.C. 154(b) by 722 days.

(21) Appl. No.: 13/036,573

(22) Filed: Feb. 28, 2011

(65) Prior Publication Data

US 2012/0188392 A1 Jul. 26, 2012

Related U.S. Application Data

(60) Provisional application No. 61/436,081, filed on Jan. 25, 2011.

(51) Int. Cl.
*H04N 5/225* (2006.01)
*H04N 5/235* (2006.01)

(52) U.S. Cl.
USPC ...................................... 348/218.1; 348/362

(58) Field of Classification Search
USPC ........... 348/47, 48, 218.1, 362, 364, 366, 367
See application file for complete search history.

(56) References Cited

U.S. PATENT DOCUMENTS

| 5,361,127 | A | 11/1994 | Daily |
| 7,061,532 | B2 | 6/2006 | Silverstein |
| 7,620,309 | B2 | 11/2009 | Georgiev |
| 7,732,744 | B2 | 6/2010 | Utagawa |
| 2001/0007473 | A1* | 7/2001 | Chuang et al. ................ 348/362 |
| 2004/0189844 | A1* | 9/2004 | McCaffrey et al. ........... 348/308 |
| 2007/0257184 | A1* | 11/2007 | Olsen et al. ................ 250/208.1 |
| 2008/0024614 | A1* | 1/2008 | Li et al. .................... 348/207.99 |
| 2009/0066813 | A1* | 3/2009 | Shibata .................... 348/231.99 |

* cited by examiner

*Primary Examiner* — Justin P Misleh
(74) *Attorney, Agent, or Firm* — Treyz Law Group; Louis R. Levenson; Michael H. Lyons

(57) ABSTRACT

An electronic device may have an array of image sensors that capture image data using different exposure times. Processing circuitry may be used to combine image data with a first exposure time and image data with a second exposure time to create a high-dynamic-range image. The image sensors may use electronic rolling shutter and global shutter image capture schemes. Using the electronic rolling shutter scheme, the reset signals for each sensor may be staggered and the read signals for each sensor may be aligned to allow synchronized readout from the image sensors. When using the global shutter scheme, image capture operations associated with a shorter exposure time may be centered in time within image capture operation associated with a longer exposure time to minimize motion artifacts. Multiple image sensors may also be used to capture short-exposure-time data that is spaced evenly in time within the longer exposure time data.

19 Claims, 6 Drawing Sheets

IMAGING SYSTEM WITH MULTIPLE SENSORS FOR PRODUCING HIGH-DYNAMIC-RANGE IMAGES

This application claims the benefit of provisional patent application No. 61/436,081, filed Jan. 25, 2011, which is hereby incorporated by reference herein in its entirety.

BACKGROUND

The present invention relates to image sensors and, more particularly, to imaging devices with arrays of image sensors that may be used to produce high-dynamic-range images.

Image sensors are commonly used in electronic devices such as cellular telephones, cameras, and computers to capture images. In a typical arrangement, an electronic device is provided with a single image sensor and a single corresponding lens. Some electronic devices use arrays of image sensors and corresponding lenses to gather image data. This type of system, which is sometimes referred to as an array camera, may be used to extend depth of focus, increase output resolution through super-resolution processing, and capture depth information from a scene.

In certain applications, such as when acquiring still or video images of a scene with a large range of light intensities, it may be desirable to capture high-dynamic range images. In high-dynamic range images, highlight and shadow detail can be retained that would otherwise be lost in a conventional image.

It would be desirable to be able to capture high-dynamic-range images with electronic devices that contain arrays of image sensors.

DETAILED DESCRIPTION

Digital camera modules are widely used in electronic devices such as digital cameras, computers, cellular telephones, and other electronic devices. These electronic devices may include image sensors that gather incoming light to capture an image. The image sensors may include arrays of image pixels. The pixels in the image sensors may include photosensitive elements such as photodiodes that convert the incoming light into digital data. Image sensors may have any number of pixels (e.g., hundreds or thousands or more). A typical image sensor may, for example, have hundreds of thousands or millions of pixels (e.g., megapixels).

Figure 1:
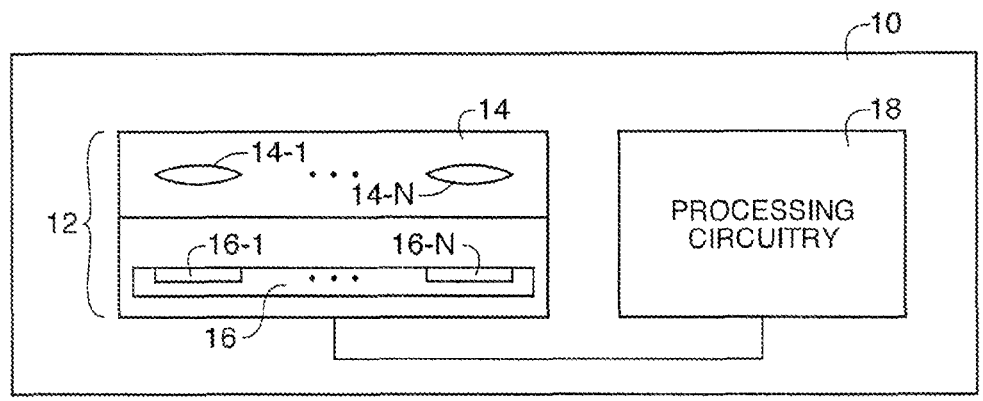
FIG. 1 is a diagram of an illustrative electronic device that contains a camera module with an array of lenses and an array of corresponding image sensors in accordance with an embodiment of the present invention.

FIG. 1 is a diagram of an illustrative electronic device that uses an image sensor to capture images. Electronic device 10 of FIG. 1 may be a portable electronic device such as a camera, a cellular telephone, a video camera, or other imaging device that captures digital image data. Camera module 12 may be used to convert incoming light into digital image data. Camera module 12 may include an array of lenses 14 and a corresponding array of image sensors 16. During image capture operations, light from a scene may be focused onto image sensors 16-1, . . . 16-N using respective lenses 14-1, . . . 14-N. Lenses 14 and image sensors 16 may be mounted in a common package and may provide image data to processing circuitry 18.

Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18. Processed image data may, if desired, be provided to external equipment (e.g., a computer or other device) using wired and/or wireless communications paths coupled to processing circuitry 18.

There may be any suitable number of lenses 14 in lens array 14 and any suitable number of image sensors in image sensor array 16. Lens array 14 may, as an example, include N*M individual lenses arranged in an N×M two-dimensional array. The values of N and M may be equal to or greater than two, may be equal to or greater than three, may exceed 10, or may have any other suitable values. Image sensor array 16 may contain a corresponding N×M two-dimensional array of individual image sensors. The image sensors may be formed on one or more separate semiconductor substrates. With one suitable arrangement, which is sometimes described herein as an example, the image sensors are formed on a common semiconductor substrate (e.g., a common silicon image sensor integrated circuit die). Each image sensor may be identical. For example, each image sensor may be a Video Graphics Array (VGA) sensor with a resolution of 480×640 sensor pixels (as an example). Other types of image may also be used for the image sensors if desired. For example, images sensors with greater than VGA resolution sensor (e.g., high-definition image sensors) or less than VGA resolution may be used, image sensor arrays in which the image sensors are not all identical may be used, etc.

The use of a camera module with an array of lenses and an array of corresponding image sensors (i.e., an array camera) may allow images to be captured with an enhanced dynamic range. In particular, one or more of the sensors may be used to capture images using a fast shutter speed (short exposure time), whereas one or more other sensors may be used to capture images using a slow shutter speed (long exposure time). The image data that is acquired with the fast shutter speed will be less likely to suffer from blown out highlights than the image data that is acquired using the slow shutter speed, whereas the image data that is acquired with the slow shutter speed will be less likely to suffer from blocked up shadows than the image data that is acquired using the high shutter speed. By combining the high-shutter-speed data and the low-shutter-speed data, the dynamic range of the captured image may be expanded. The processing operations that are used to combine the high-shutter-speed data and the low-shutter-speed data may be implemented using processing circuitry 18 and/or external computing equipment.

Figure 2:
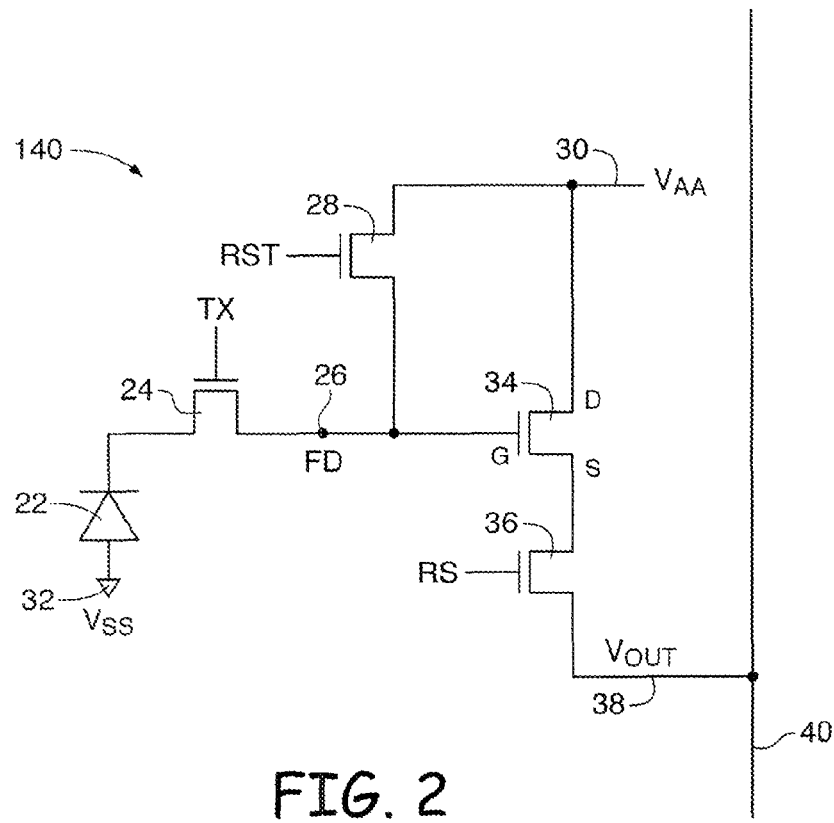
FIG. 2 is a diagram of an illustrative pixel in an image sensor in accordance with an embodiment of the present invention.

Circuitry in an illustrative pixel of one of the image sensors in sensor array 16 is shown in FIG. 2. As shown in FIG. 2, pixel 140 includes a photosensitive element such as photodiode 22. A positive power supply voltage (e.g., voltage Vaa) may be supplied at positive power supply terminal 30. A ground power supply voltage (e.g., Vss) may be supplied at ground terminal 32. Incoming light is collected by photodiode 22 after passing through a color filter structure. Photodiode 22 converts the light to electrical charge.

Before an image is acquired, reset control signal RST may be asserted. This turns on reset transistor 28 and resets charge storage node 26 (also referred to as floating diffusion FD) to Vaa. The reset control signal RST may then be deasserted to turn off reset transistor 28. After the reset process is complete, transfer gate control signal TX may be asserted to turn on transfer transistor (transfer gate) 24. When transfer transistor 24 is turned on, the charge that has been generated by photodiode 22 in response to incoming light is transferred to charge storage node 26. Charge storage node 26 may be implemented using a region of doped semiconductor (e.g., a doped silicon region formed in a silicon substrate by ion implantation, impurity diffusion, or other doping techniques). The doped semiconductor region (i.e., the floating diffusion FD) exhibits a capacitance that can be used to store the charge that has been transferred from photodiode 22. The signal associated with the stored charge on node 26 is conveyed to row select transistor 36 by source-follower transistor 34. When it is desired to read out the value of the stored charge (i.e., the value of the stored charge that is represented by the signal at the source S of transistor 34), row select control signal RS can be asserted. When signal RS is asserted, transistor 36 turns on and a corresponding signal Vout that is representative of the magnitude of the charge on charge storage node 26 is produced on output path 38. In a typical configuration, there are numerous rows and columns of pixels such as pixel 140 in array 12. A vertical conductive path such as path 40 can be associated with each column of pixels. When signal RS is asserted in a given row, path 40 can be used to route signal Vout from that row to readout circuitry. If desired, other types of image pixel circuitry may be used to implement the image pixels of sensors 16-1, . . . 16-N. The circuitry of FIG. 2 is merely illustrative.

Figure 3:
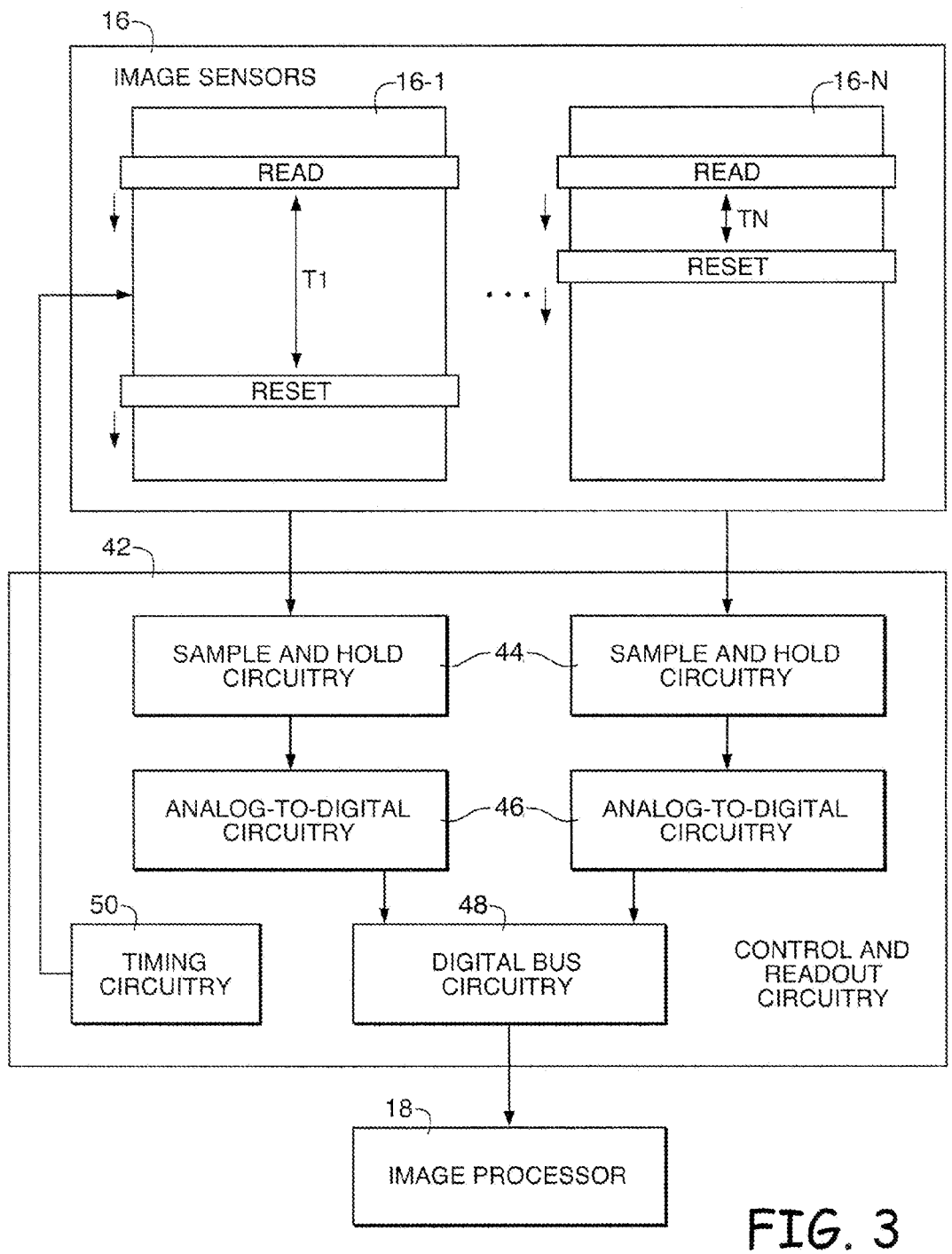
FIG. 3 is a circuit diagram of circuitry used in capturing high-dynamic-range images in an electronic device of the type shown in FIG. 1 in accordance with an embodiment of the present invention.

FIG. 3 is a circuit diagram showing how data may be captured using sensors 16-1 and 16-N. Image sensors 16-1 . . . 16-N may, if desired, be controlled using an electronic rolling shutter (ERS) readout scheme. With this type of arrangement, data in each sensor is reset on a row-by-row basis. Data is also read out from each sensor on a row-by-row basis. The read pointer for each sensor lags behind the reset pointer for that sensor by a number of rows that is proportional to the exposure time for that sensor. To capture high-dynamic-range images, at least some of the sensors have different exposure times. As shown in the FIG. 3 example, sensor 16-1 may have a relatively long exposure time of TL (proportional to the relatively large number of rows interposed between the reset row pointer and read row pointer in the image sensor pixel array of sensor 16-1) and sensor 16-N may have a relatively short exposure time of TN (proportional to the relatively small number of rows between the reset row pointer and read row pointer in image sensor 16-N).

Control and readout circuitry 42 may be used in controlling the image data capture and readout process. Timing circuitry 50 may be used in issuing control signals for image sensors 16 (e.g., by asserting RST in appropriate rows to reset those rows, by asserting RS in appropriate rows to read data from those rows, etc.). When a row of data is being read out over corresponding paths 40 (FIG. 2), sample and hold circuitry 44 may be used to capture the signals present on paths 40. Analog-to-digital converter circuitry 46 may be used to digitize the analog signal data that has been gathered using sample and hold circuitry 44. Corresponding digital output data from circuitry 46 may be provided to digital bus circuitry 48, which routes this data to image processor 18 (FIG. 1). In image processor 18, the data from image sensors such as image sensor 16-1 that have relatively longer exposure times may be combined with the data from image sensors such as image sensor 16-N to produce a high-dynamic-range image.

Figure 4:
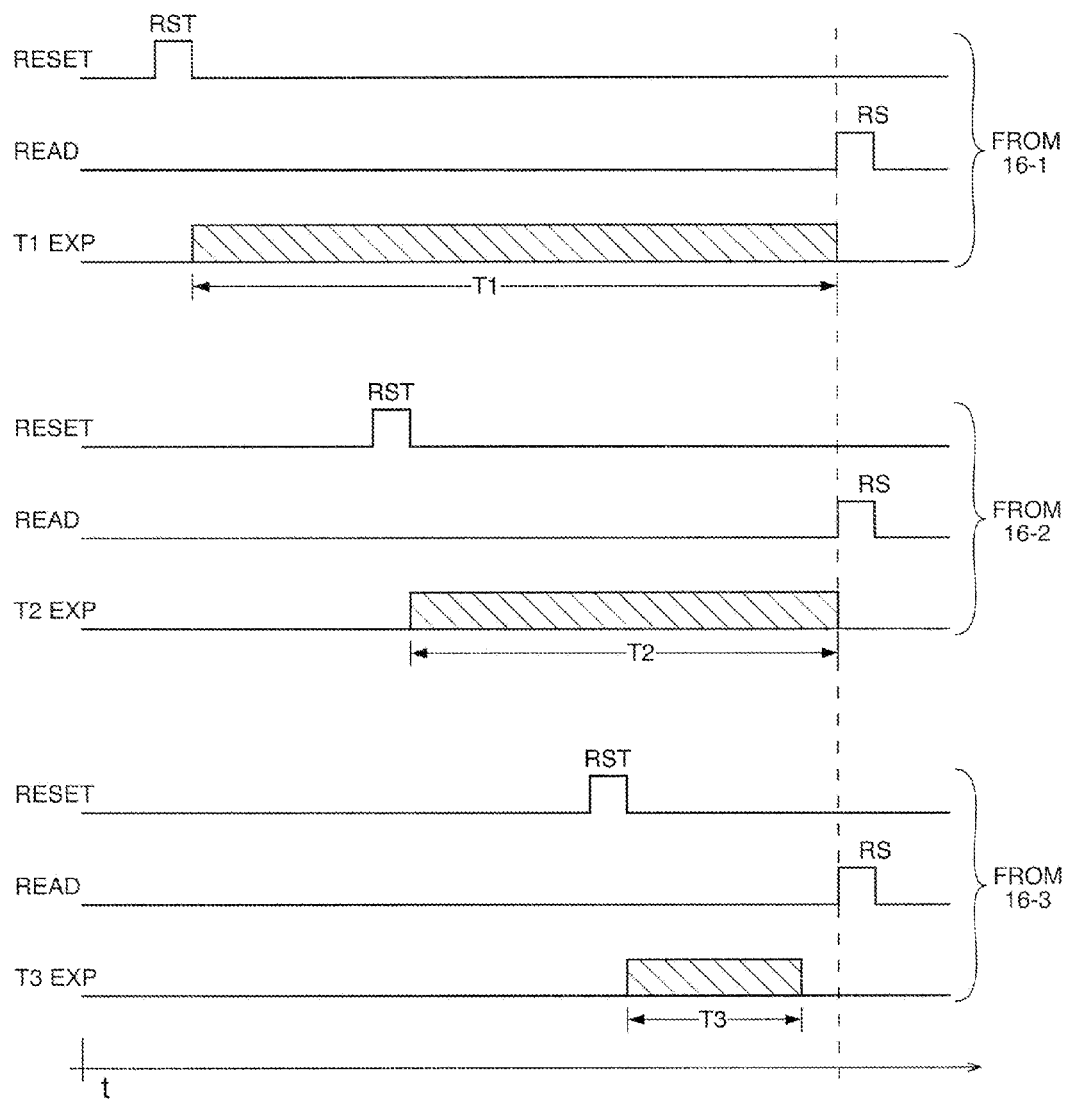
FIG. 4 is a timing diagram showing signals associated with capturing high-dynamic-range images using an electronic rolling shutter arrangement in accordance with an embodiment of the present invention.

Timing circuitry 50 may issue reset signals RST and read signals RS that have timing characteristics of the type shown in FIG. 4. In the example of FIG. 4, there are three image sensors 16-1, 16-2, and 16-3 in image sensor array 16. Each image sensor is being used to capture image data with a different exposure time using an electronic rolling shutter arrangement. In particular, image sensor 16-1 is being used to capture image data using exposure time T1, image sensor 16-2 is being used to capture image data using exposure time T2, and image sensor 16-3 is being used to capture image data using exposure time T3. As shown in FIG. 4, time T1 is greater than time T2 and time T2 is greater than time T1. The illustrative arrangement of FIG. 4 is presented as an example. If desired, image sensor array 16 may be used to produce data with more than three exposure times or with fewer than three exposure times. The FIG. 4 example is merely illustrative.

As shown in the traces of FIG. 4, timing circuitry 50 may issue staggered reset signals RST and synchronized read signals RS. This allows data to be read out from sensors 16 in a synchronized fashion without requiring large additional amounts of buffer memory to support the capture of high-dynamic-range images. In particular, timing circuitry 50 may assert read signal RS in a given row of sensor 16-1 at the same time that timing circuitry 50 asserts read signal RS in the same given row of sensor 16-2 and at the same time that timing circuitry 50 asserts the read signal RS the same given row of sensor 16-3. The reset signals RST may be independently asserted in each sensor. For example, the reset signal RST in the given row of sensor 16-1 may be asserted at a time T1 before the read signal RS is asserted in the given row, the reset signal RST in the given row of sensor 16-2 may be asserted at time T2 before the read signal RS, and the reset signal RST in the given row of sensor 16-3 may be asserted at time T3 before the read signal. Because the rows of data from each of sensors 16-1, 16-2, and 16-3 can be read out simultaneously, this data can flow in parallel through sample-and-hold circuitry 44, analog-to-digital converter circuitry 46, and digital bus circuitry 48. Image processor circuitry 18 may therefore process this data one row at a time as the data is read from sensors 16-1, 16-2, and 16-3. Processing data on a row-wise basis in this way can help reduce the amount of memory and processing circuitry that would otherwise be required to combine the captured image data from each of the sensors into a high-dynamic-range image.

If desired, the sensors of sensor array 16 may each use a global shutter configuration, rather than an electronic rolling shutter. With a global shutter readout scheme, all of the pixels in an image sensor are reset simultaneously. A transfer operation is then used to simultaneously transfer the image data from each pixel into an adjacent storage element (e.g., a local storage capacitor). Data from each sensor may then be read out row-by-row from the storage elements.

Figure 5:
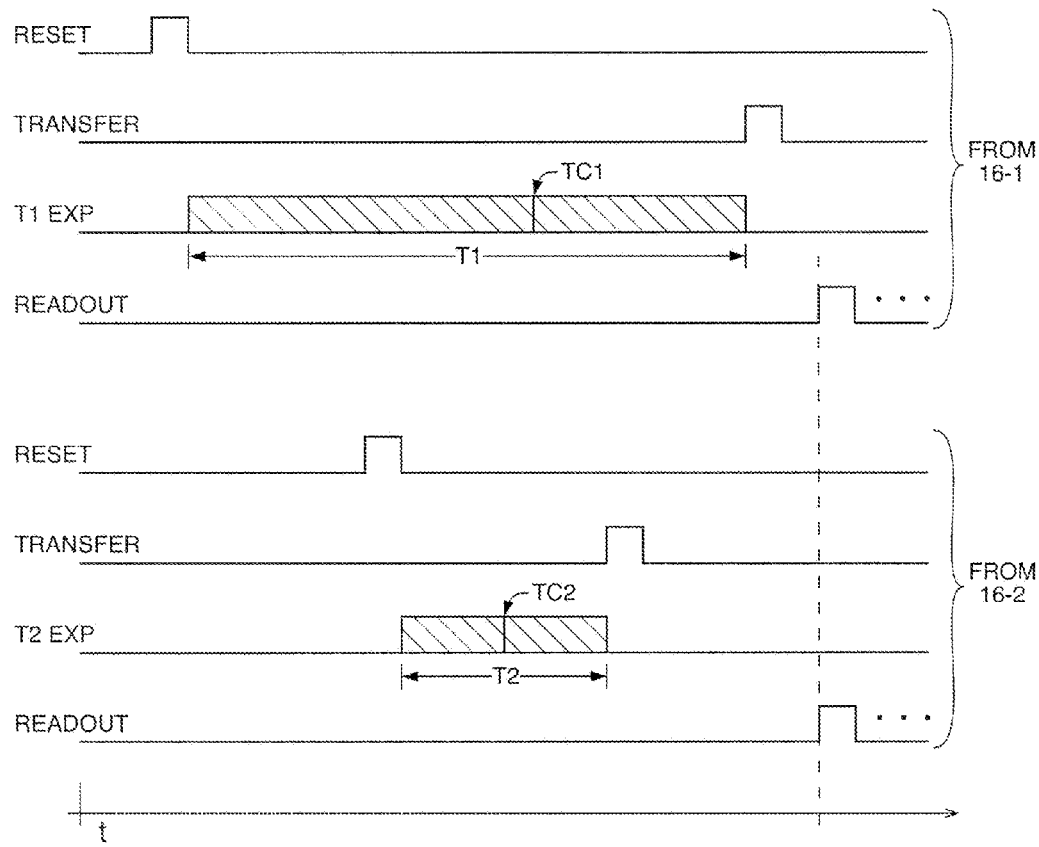
FIG. 5 is a timing diagram showing signals associated with capturing high-dynamic-range images using a global shutter scheme in accordance with an embodiment of the present invention.

FIG. 5 is a timing diagram showing the relative timing between signals of the type that may be used in connection with capturing high-dynamic-range images using an array of sensors that are controlled using a global shutter scheme. In the example of FIG. 5, there are two image sensors in array 16: image sensor 16-1, which is used to capture images using a longer exposure time T1, and image sensor 1602, which is used to capture images using a shorter exposure time T2. Each image sensor is reset by asserting a global reset signal RESET. Following image capture operations, the transfer signal TRANSFER is asserted to transfer captured image data from each image pixel to an associated storage element. In the FIG. 5 example, the data in sensor 16-1 is transferred after an exposure time T1 and the data in sensor 16-2 is transferred after an exposure time T2. This allows sensor 16-1 to capture more shadow detail than sensor 16-2 and allows sensor 16-2 to capture more highlight detail than sensor 16-1.

To avoid undesirable motion artifacts, the exposure time for image sensor 16-2 (i.e., the shorter exposure time sensor) may be substantially centered within the middle of the exposure time for image sensor 16-1 (i.e., the longer exposure time sensor). In particular, the center time TC1 of long exposure T1 may be vary from center time TC2 by less than 20% of long exposure time T1, by less than 10% of long exposure time T1, or by less than 5% of long exposure time T1 (as examples).

After the data from all of the image sensors has been transferred using the global transfer signals TRANSFER, the data may be read out row-by-row using control and readout circuitry such as circuitry 42 of FIG. 3. Processor 18 may be used to combine the long-exposure and short-exposure data to produce high-dynamic-range images.

In an array camera with multiple sensors, multiple short-exposure image sensors may be used to capture image data throughout the length of a longer exposure image. During image reconstruction, multiple short-exposure images may be processed (e.g., summed) to produce an image with a desired exposure time. This type of approach minimizes motion artifacts by making the motion characteristics of the short-exposure-time image data similar to that of the long-exposure-time image data before combining the data to produce a high-dynamic-range image (e.g., a high-dynamic-range image frame in a video stream).

Figure 6:
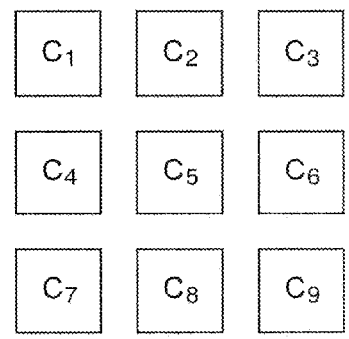
FIG. 6 is a diagram of an illustrative image array having nine image sensors of the type that may be used in the electronic device of FIG. 1 to capture high-dynamic-range images in accordance with an embodiment of the present invention.
Figure 7:
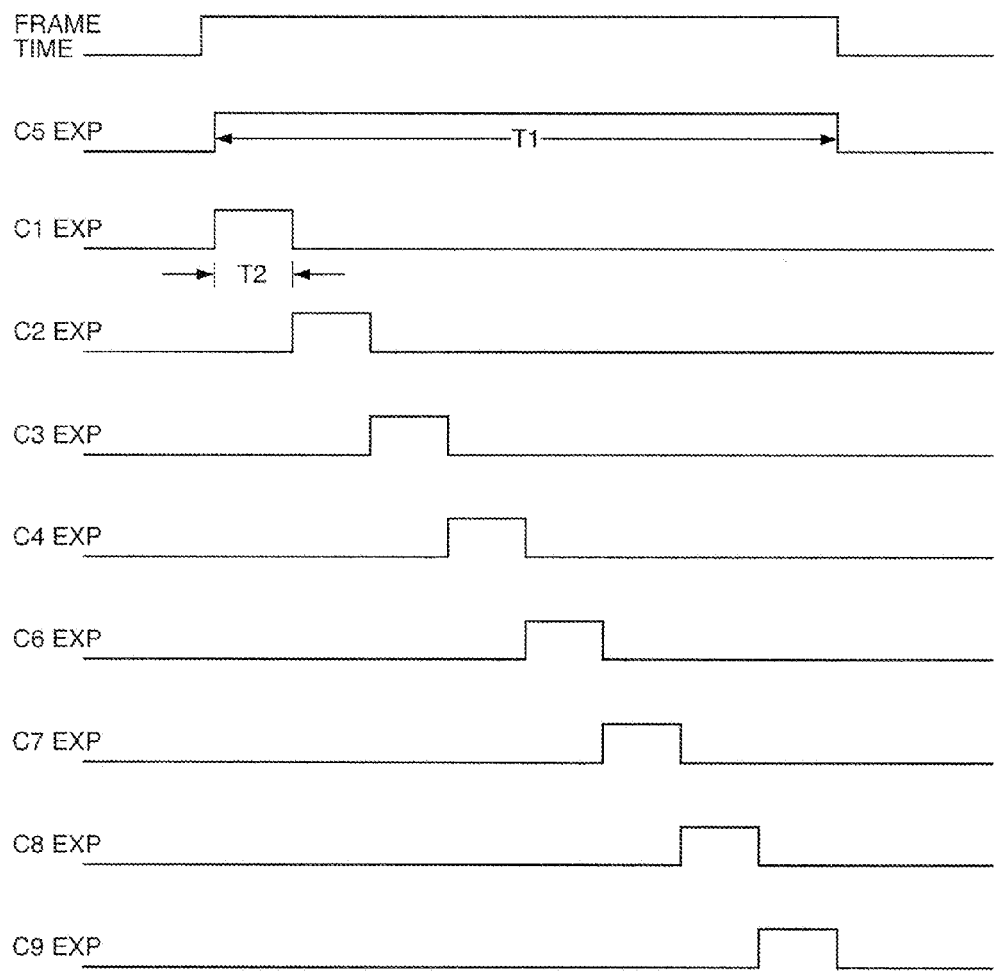
FIG. 7 is a timing diagram showing signals associated with a scheme for capturing high-dynamic-range images with minimized motion artifacts using an array of image sensors of the type shown in FIG. 6 in accordance with an embodiment of the present invention.

Consider, as an example, an image sensor array such as array 16 of FIG. 6, containing nine image sensors C1, C2, C3, C4, C5, C6, C7, C8, and C9. In this example, image sensor C5 (e.g., the central image sensor in the 3×3 array of FIG. 6) is used for capturing image data with a long exposure time T1 (which may be, for example, less than the frame time for a video frame for which the captured image data is to be used). The other image sensors (i.e., image sensors C1, C2, C3, C4, C6, C7, C8, and C9) may be used to capture image data with a short exposure time T2. As an example, T2 may be equal to one tenth of T1. Because there are eight sensors associated with capturing short-exposure-time data, it is possible to spread out the times at which the short-exposure-time sensors capture their image data evenly throughout the long exposure time T2, as shown in FIG. 7. With this scheme, each short-exposure-time image samples a different portion of the scene motion associated with the long-exposure-time image captured using sensor C5. As a result, the image data associated with the multiple short-exposure-time images will collectively have motion characteristics similar to the image data associated with the long-exposure-time image. During image processing operations to produce a high-dynamic-range image, the image data from each of the short-exposure-time images may be combined together (e.g., by summing) and combined with the long-exposure-time data from sensor C5 to produce a high-dynamic-range image. The images that are captured using the sensors of FIG. 6 may be used as still images or may be captured repeatedly as part of a video stream (i.e., each high-dynamic-range image may correspond to a respective video frame in a video stream).

Figure 8:
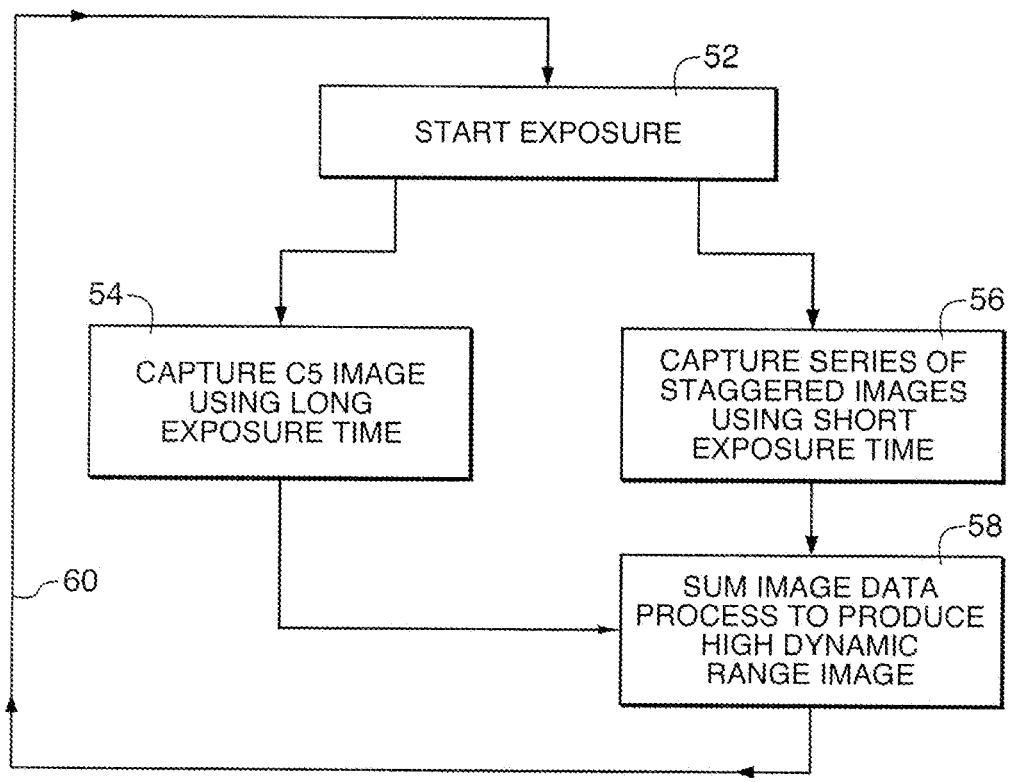
FIG. 8 is a flow chart of illustrative steps involved in capturing high-dynamic-range images using a scheme of the type shown in FIG. 7 in accordance with an embodiment of the present invention.

Illustrative steps involved in capturing moving or still images using an arrangement of the type described in connection with FIGS. 6 and 7 are shown in FIG. 8. At step 52, image exposure operations may be initiated. For example, exposure operations for a still image may be initiated upon detection of a button press or other user input in a camera. Exposure operations in a video context may be initiated by completion of the acquisition of a preceding video frame.

During the operations of step 54, one of the sensors in sensor array 16 (e.g., sensor C5 of FIG. 6) may be used to capture image data with a longer exposure time (e.g., time T1 of FIG. 7). While capturing image data with the long-exposure-time sensor, the remaining sensors in image sensor array 16 may be used to capture a series of evenly spaced (in time) short-exposure-time images such as the images associated with sensors C1, C2, C3, C4, C6, C7, C8, and C9 of FIG. 6 (step 56).

At step 58, the image data from the short-exposure-time images may be summed (e.g., using processing circuitry 18), so that the short-exposure time data has motion characteristics similar to the long-exposure time data. The summed short-exposure-time data and the long-exposure-time data may be combined to form a high-dynamic-range image (e.g., using processing circuitry 18). This process may be repeated continuously, as indicated by line 60 (e.g., when the high-dynamic-range images are associated with frames in a video stream).

Various embodiments have been described illustrating electronic devices such as portable electronic devices with camera modules. A camera module may have an image sensor array that includes multiple image sensors and may have a corresponding lens array. The exposure times for the image sensors in the image sensor array may be different for different sensors. For example, at least one of the image sensors may be used to capture image data using a long exposure time and at least one of the image sensors may be used to capture image data using a short exposure time. The long-exposure-time and short-exposure-time data may be combined to form a high-dynamic-range image. Still and video high-dynamic-range images may be captured.

The short-exposure-time and long-exposure time images may be captured using image sensors that use electronic rolling shutter schemes to capture image data. In this type of arrangement, the read pointers from each of the image sensors may be aligned. The reset pointers for each image sensor may be staggered to provide each image sensor with a desired exposure time. By synchronizing the reading operations between sensors, rows of image data from each sensor may be read out in parallel, minimizing the use of buffer resources.

If desired, short-exposure-time and long-exposure time images may be captured using image sensors with global shutter configurations. To minimize motion artifacts, the exposure time for a short-exposure-time image may be centered within the exposure time for a long-exposure-time image.

In an image sensor with multiple image sensors available for capturing short-exposure-time images, the exposure times for the short-exposure-time images may be spread out within the exposure time for the long-exposure-time image. This technique ensures that the image data associated with the short-exposure-time images will have motion characteristics such as levels of motion-induced blur that are well matched with the motion characteristics of the long-exposure-time image, thereby improving perceived image quality.

The foregoing is merely illustrative of the principles of this invention which can be practiced in other embodiments.

What is claimed is:

1. A method for capturing image data for a high-dynamic-range image using multiple image sensors in an electronic device each of which receives image light through a respective lens in a lens array in the electronic device, the method comprising:
    with a first of the image sensors, capturing image data using a first exposure time;
    with a second of the image sensors, capturing image data using a second exposure time that is longer than the first exposure time; and
    in synchronization, reading out data from rows of image pixels in the first and second image sensors using control circuitry in the electronic device, wherein the first and second image sensors use an electronic rolling shutter scheme to capture images; and
    asserting a first reset signal for the first image sensor at a first time, asserting a second reset signal for the second image sensor at a second time subsequent to the first time, wherein reading out the data from the first and second image sensors comprises asserting a read signal for a given row in the first image sensor at a third time and simultaneously asserting a read signal for the given row in the second image sensor at the third time, wherein the third time is after the first and second times.

2. The method defined in claim 1 further comprising:
    with processing circuitry in the electronic device, combining the image data captured using the first exposure time with the image data captured using the second exposure time to produce the high-dynamic-range image.

3. The method defined in claim 2 wherein the multiple image sensors include a third image sensor, the method further comprising:
    with the third image sensor, capturing image data using a third exposure time.

4. The method defined in claim 3 wherein the third exposure time is longer than the first exposure time and shorter than the second exposure time.

5. The method defined in claim 4 wherein combining the image data comprises combining the image data captured with the third exposure time with the image data captured using the first and second exposure times to produce the high-dynamic-range image.

6. A method for capturing image data for a high-dynamic-range image using multiple image sensors in an electronic device each of which receives image light through a respective lens in a lens array in the electronic device, the method comprising:
    with a first of the image sensors, capturing image data with a first exposure time using a global shutter scheme;
    with a second of the image sensors, capturing image data with a second exposure time that is longer than the first exposure time using a global shutter scheme, wherein the first and second exposure times overlap, wherein capturing the image data comprises capturing at least some of the image data with the second exposure time while simultaneously capturing at least some of the data with the first exposure time, and wherein capturing the image data comprises capturing the image data so that the image data with the first exposure time is centered in time with respect to the image data with the second exposure time.

7. The method defined in claim 6 further comprising:
    with an image processor in the electronic device, combining the image data with the first exposure time and the image data with the second exposure time to produce the high-dynamic-range image.

8. The method defined in claim 7 wherein capturing the image data comprises asserting a transfer signal at a different time in each of the image sensors.

9. The method defined in claim 8 further comprising:
    simultaneously reading out rows of image data from the first and second image sensors following assertion of the transfer signals in each of the image sensors.

10. The method defined in claim 6, wherein the image data with the first exposure time has a first center time, wherein the image data with the second exposure time has a second center time, and wherein capturing the image data further comprises:
    capturing the image data so that the second center time varies from the first center time by less than twenty percent of the second exposure time.

11. The method defined in claim 10, wherein capturing the image data further comprises:
    capturing the image data so that the second center time varies from the first center time by less than five percent of the second exposure time.

12. The method defined in claim 10, wherein capturing the image data further comprises:
    asserting a first reset signal at a first time in the first image sensor;
    asserting a second reset signal at a second time prior to the first time in the second image sensor;
    asserting a first charge transfer signal at a third time that is after the first and second times in the first image sensor;
    asserting a second charge transfer signal at a fourth time that is after the third time in the second image sensor;
    asserting a first readout signal at a fifth time that is after the fourth time in the first image sensor; and
    asserting a second readout signal at the fifth time in the second image sensor, wherein the first center time is centered in time between the first and third times, and wherein the second center time is centered in time between the second and fourth times so that image data with the first exposure time has similar motion characteristics as the image data with the second exposure time.

13. A method for capturing image data for a high-dynamic-range image using multiple image sensors in an electronic device each of which receives image light through a respective lens in a lens array in the electronic device, the method comprising:
    with a given one of the image sensors, capturing image data with a first exposure time; and
    with a plurality of the image sensors other than the given one of the image sensors, capturing image data with a second exposure time that is shorter than the first exposure time, wherein capturing the image data with the second exposure time comprises capturing image data from the plurality of image sensors other than the given image sensor using a sequence of identical exposure times that are evenly spaced among the first exposure time.

14. The method defined in claim 13 further comprising:

with an image processor in the electronic device, combining the image data with the first exposure time and the image data with the second exposure time to produce a high-dynamic-range image.

15. The method defined in claim 14 wherein the image data with the second exposure time comprises image data from each of the plurality of image sensors other than the given one of the image sensors and wherein combining the image data comprises summing the image data from each of the plurality of image sensors.

16. The method defined in claim 15 wherein the plurality of image sensors other than the given one of the image sensors include at least eight sensors.

17. The method defined in claim 13 further comprising capturing multiple frames of video data by repeatedly using the multiple image sensors to capture data with the first and second exposure times.

18. The method defined in claim 13, wherein each exposure time of the sequence of exposure times occurs during different respective time periods, and wherein each exposure time of the sequence of exposure times has an identical duration.

19. The method defined in claim 18, wherein capturing the image data from the plurality of image sensors other than the given image sensor using the sequence of identical exposure times comprises capturing the sequence of identical exposure times so that a sum of each of the identical exposure times in the sequence is equal to the first exposure time.

\* \* \* \* \*